United States Patent [19]
Miyoshi

[11] Patent Number: 5,636,375
[45] Date of Patent: Jun. 3, 1997

[54] EMULATOR FOR HIGH SPEED, CONTINUOUS AND DISCONTINUOUS INSTRUCTION FETCHES

[75] Inventor: Akio Miyoshi, Oume, Japan

[73] Assignee: Kabushiki Kaisha Toshiba, Kawasaki, Japan

[21] Appl. No.: 619,138

[22] Filed: Mar. 20, 1996

Related U.S. Application Data

[63] Continuation of Ser. No. 221,448, Apr. 1, 1994, abandoned, which is a continuation of Ser. No. 841,331, Feb. 25, 1992, abandoned.

[30] Foreign Application Priority Data

Feb. 25, 1991 [JP] Japan ..................... 3-029982

[51] Int. Cl.⁶ ..................................... G06F 9/455
[52] U.S. Cl. .................... 395/580; 395/568; 395/500
[58] Field of Search .......................... 395/375, 500, 395/250, 465

[56] References Cited

U.S. PATENT DOCUMENTS

| | | | |
|---|---|---|---|
| 4,298,927 | 11/1981 | Berglund et al. | 395/375 |
| 4,325,120 | 4/1982 | Colley et al. | 395/375 |
| 4,415,969 | 11/1983 | Bayliss et al. | 395/375 |
| 4,638,423 | 1/1987 | Ballard | 395/500 |
| 4,701,844 | 10/1987 | Thompson et al. | 395/446 |
| 4,788,683 | 11/1988 | Hester et al. | 371/183.06 |
| 4,791,557 | 12/1988 | Angel et al. | 395/375 |
| 4,812,775 | 3/1989 | Adachi et al. | 395/500 |
| 4,839,797 | 6/1989 | Katori et al. | 395/375 |
| 4,851,993 | 7/1989 | Chen et al. | 395/250 |
| 4,853,840 | 8/1989 | Shibuya | 395/375 |
| 4,984,154 | 1/1991 | Hanatani et al. | 395/375 |
| 5,093,776 | 3/1992 | Morss et al. | 395/500 |
| 5,134,701 | 7/1992 | Mueller et al. | 395/500 |
| 5,167,023 | 11/1992 | de Nicolas et al. | 395/375 |
| 5,187,793 | 2/1993 | Keith et al. | 395/775 |
| 5,210,832 | 5/1993 | Maier et al. | 395/375 |

Primary Examiner—Parshotam S. Lall
Assistant Examiner—Viet Vu
Attorney, Agent, or Firm—Foley & Lardner

[57] ABSTRACT

A jump judgment circuit judges whether an instruction read bus cycle of a CPU to be emulated is to be executed in a sequential order of addresses of a memory. A control circuit operates in accordance with the judgment result. Specifically, if an instruction is in the sequential order of addresses of a memory relative to the immediately preceding instruction, instruction codes previously read from the memory and converted are read from a queue and supplied to the CPU. If an instruction is not in the sequential order of addresses, which would correspond to a jump to a noncontiguous address of a memory, that instruction is read from the memory at the designated address, converted into instruction codes, and supplied to CPU.

18 Claims, 2 Drawing Sheets

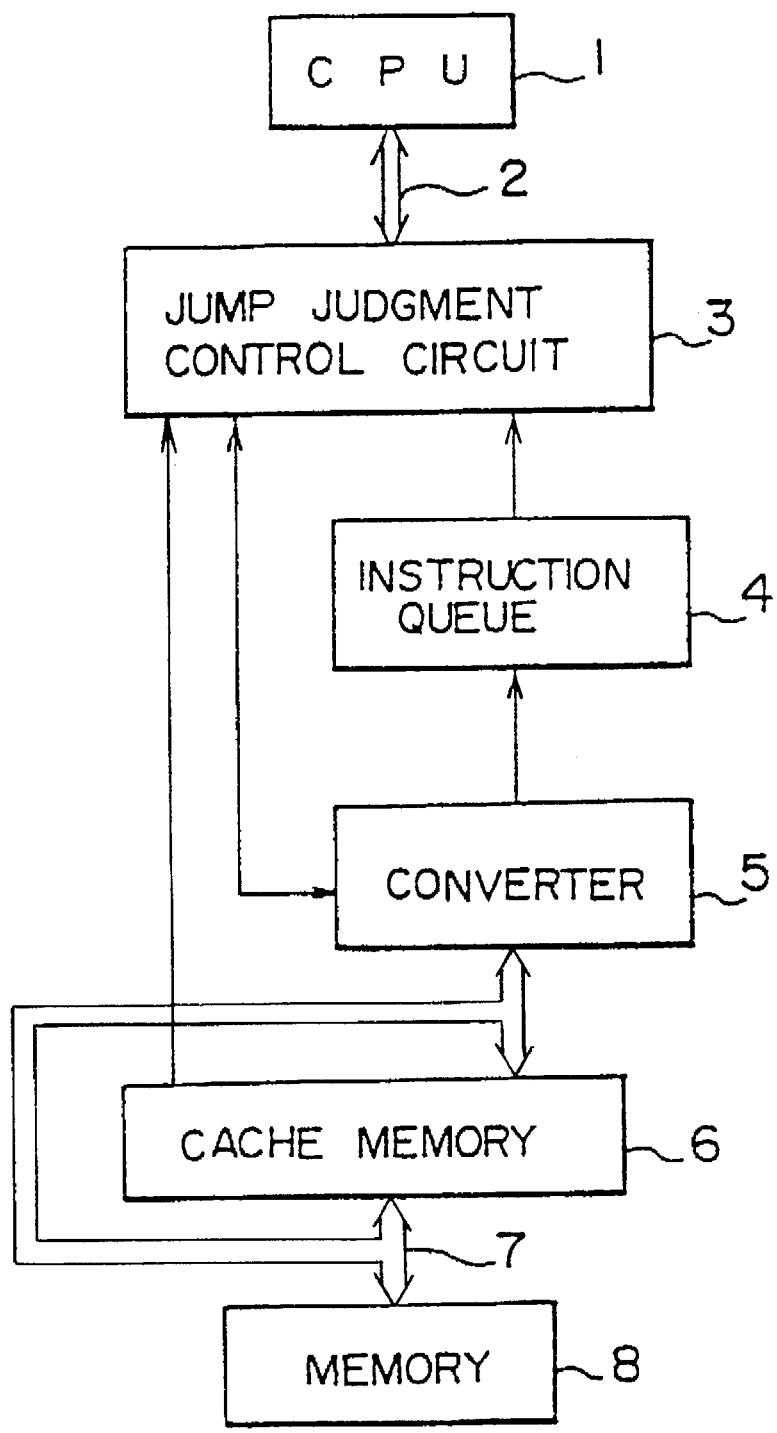
F I G. 1

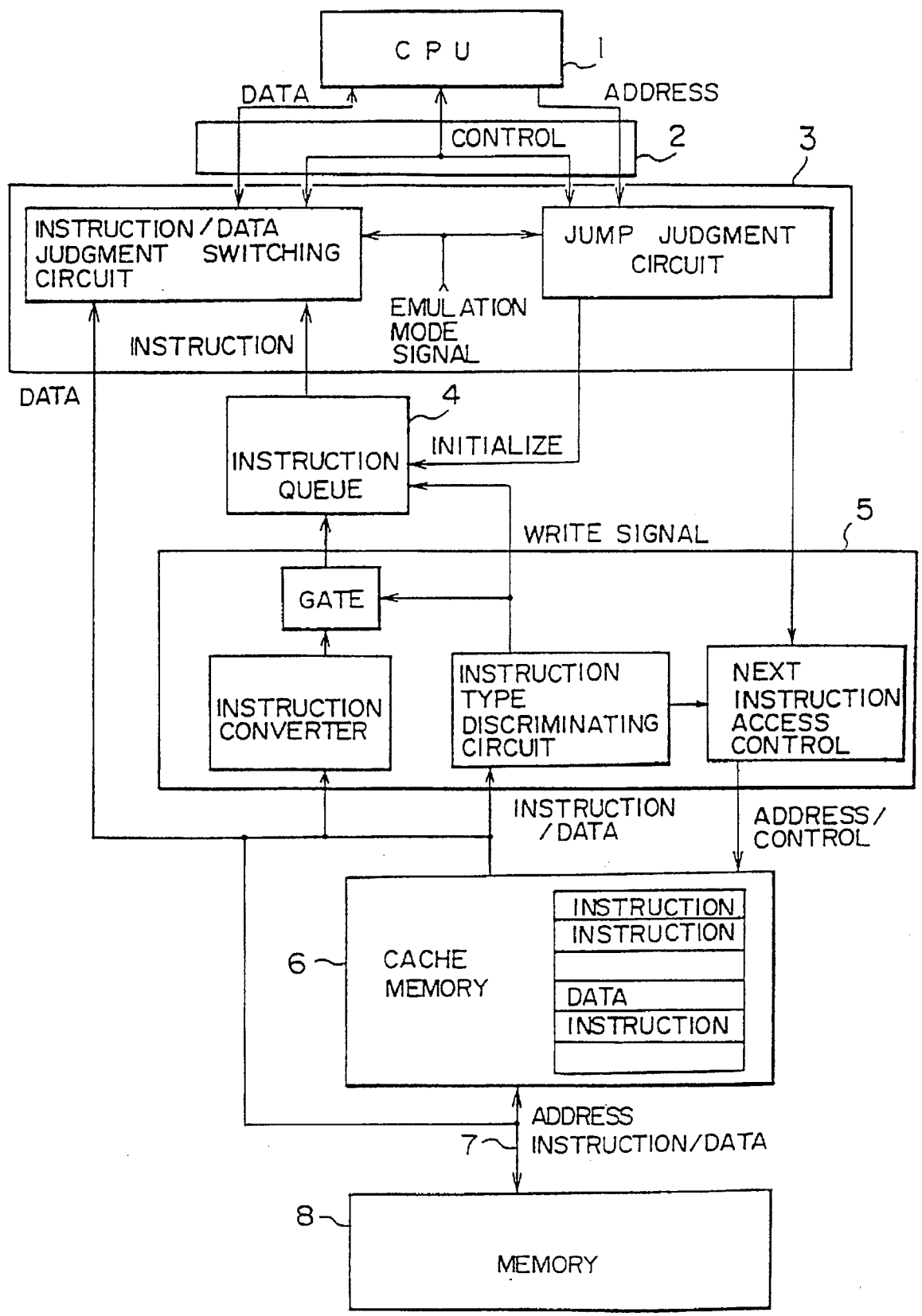
F I G. 2

EMULATOR FOR HIGH SPEED, CONTINUOUS AND DISCONTINUOUS INSTRUCTION FETCHES

This application is a continuation of application Ser. No. 08/221,448, filed Apr. 1, 1994 now abandoned, which is a continuation of 07/841,331, filed Feb. 25, 1992 now abandoned.

FIELD OF THE INVENTION

The present invention relates to an emulator, and more particularly to an emulator suitable for high speed emulation of computers.

BACKGROUND OF THE INVENTION

Two methods have been used conventionally for emulation of CPU instructions having a different instruction type. One method is a compiler method in which a set of instructions is compiled in advance. The other method is an interpreter method in which each instruction is interpreted when it is executed.

The above-described conventional methods have the following disadvantages. With the compiler method, it is necessary to convert object codes and store them in advance, which is inconvenient for practical use. With the interpreter method, an object code is read and interpreted as a kind of data and another instruction is executed which provides the same results of an original instruction.

SUMMARY OF THE INVENTION

The present invention has been made considering the above situations. It is an object of the present invention to provide an emulator capable of emulating at such a high speed as the compiler method without a need of compiling like the interpreter method.

Jump judgment means judges whether an instruction read bus cycle of CPU to be emulated is executed in the sequential order of addresses of a memory. Control means operates in accordance with the judgment result. Specifically, if an instruction is in the sequential order of addresses, instruction codes previously read from the memory and converted are read from queue means and supplied to CPU. If an instruction is not in the sequential order of addresses, the instruction is read from the memory at the designated address, converted into instruction codes, and supplied to CPU.

As described above, according to the present invention, it is not necessary to convert an instruction into object codes in advance. Therefore, the operability like the interpreter method can be realized while solving the problem of low speed of the interpreter method and providing high speed emulation.

BRIEF DESCRIPTION OF THE DRAWINGS

FIG. 1 is a block diagram showing an embodiment of an emulator according to the present invention; and FIG. 2 is a block diagram showing the detailed structure of the emulator.

DESCRIPTION OF THE PREFERRED EMBODIMENT

A preferred embodiment of the present invention will be described with reference to the accompanying drawings.

FIG. 1 is a block diagram showing an embodiment of the emulator according to the present invention. In FIG. 1, a CPU 1 is connected to a CPU local bus 2. A signal from CPU 1 is inputted to a jump judgment control circuit 3 via the CPU local bus 2. A converter 5 supplies an address to a memory 8 via cache memory 6 and a memory bus 7, receives an instruction from the memory 8 via the cache memory 6 and the memory bus 7. The received instruction is converted into instruction codes matching CPU 1. An instruction queue 4 stores instruction codes supplied from the converter 5. The jump judgment control circuit judges whether an instruction outputted from CPU 1 is discontinuous. The instruction queue 4 supplies instruction codes to CPU 1 via the jump judgment control circuit 3 if the instruction fetch from CPU 1 is continuous. If discontinuous, the converter 5 receives an address from the jump judgment control circuit 3, and reads an instruction from the memory 8 at the received address via the cache memory 6 and the memory bus 7. The converter 5 converts the read instruction into instruction codes matching CPU 1, and supplies it to the initialized instruction queue 4, whereby "initialized" signifies that the instruction queue 4 has purged all previous instructions residing in the instruction queue 4 based on an "initialize" command from the jump judgment control circuit 3. The cache memory 6 is connected to the memory bus 7. The cache memory 6 stores an instruction read from the memory 8 via the memory bus 7. The once stored instruction is thereafter read at a high speed from the cache memory 6. The particular structure of the emulator of FIG. 1 is shown in FIG. 2.

The operation of the emulator constructed as above will be described below.

A signal from CPU 1 is inputted via the CPU local bus 2 to the jump judgment control circuit 3. This jump judgment control circuit 3 judges Whether CPU 1 executes a jump instruction or the like to read a discontinuous instruction. For example, it is judged as reading a discontinuous instruction if CPU 1 outputs a signal indicating to clear an internal queue of CPU 1. Such a queue clear signal is generally provided in CPU 1 for CPU development tools. If such a signal is not provided, judgment is performed by providing a circuit for judging whether an instruction fetch address is discontinuous. If an instruction fetch is discontinuous, an address for the instruction is supplied from the jump judgment control circuit 3 to the converter 5. The converter 5 reads the instruction from the cache memory 6 and the memory 8 at the address, converts it into instruction codes, and supplies them to the initialized instruction queue 4. The jump judgment control circuit 3 reads the instruction codes from the instruction queue 4 and supplies them to CPU 1 via the CPU local bus 2.

The converter 5 repeats thereafter the operations of reading an instruction at the following address, converting it into instruction codes, and supplying them in the instruction queue 4.

If an instruction fetch by CPU 1 is continuous, instruction codes are read from the instruction queue 4 and supplied to CPU 1. If converted instruction codes are not stored in the instruction queue 4, the process stands by until they are stored. In order to speed up conversion, the cache memory 6 is provided. An instruction once read from the memory 8 via the memory bus 7 is read directly from the cache memory 6 at the next and following accesses.

The cache memory 6 stores a memory address and the data at the address, and it stores not only instructions but also data. In view of this, the jump judgment control circuit 3 is configured such that it can judge whether a signal from CPU 1 is an instruction or data. If it is judged as data, CPU 1 directly accesses the cache memory 6 or memory 8 without using the instruction queue 4. This CPU system does not always execute emulation, but instructions inherent to CPU 1 stored in the memory 8 are executed in some cases. In view of this, a circuit for generating a signal discriminating between emulation and non-emulation is provided within the jump judgment control circuit 3. In the operation other than emulation, the cache memory 6 or memory 8 is directly accessed without using the instruction queue 4.

The converter 5 discriminates the types of instruction prior to conversion. If an instruction is an unconditional branch instruction, a new instruction is fetched from the branch destination address, converted, and supplied to the instruction queue 4. On the side of CPU 1, this unconditional branch instruction is not executed to omit a jump operation and continuously execute the instructions before and after the branch instruction.

In the above operation, code conversion as performed by the conventional compiler method is not necessary and the CPU operations can be handled in a manner like the interpreter method, while allowing high speed emulation as compared to the conventional interpreter method. If the cache memory 6 has a large capacity, 90% or more of instructions can be accessed at a high speed so that they are converted into instruction codes at a high speed. If instructions are continuous, these instructions can be maintained and stored in the instruction queue 4. Therefore, such instructions can be executed at the speed substantially the same as those instructions inherent to CPU 1. Furthermore, if a jump instruction is an unconditional jump instruction, executing it can be omitted to further speed up the operation.

What is claimed is:

1. An emulation apparatus, comprising:
   memory means for storing instructions;
   memory bus means for transmitting addresses to said memory means and reading instructions corresponding to the transmitted addresses from said memory means;
   cache memory means for storing the instructions read from said memory means through said memory bus means;
   converting means for receiving instructions corresponding to an address transmitted from a CPU to be emulated, the received instructions being read from said cache memory means via said memory bus means when the received instructions are obtained from said cache memory means and being read from said memory means via said memory bus means when the received instructions are not obtained from said cache memory means, and for converting the received instructions into instruction codes;
   instruction queue means for storing the instruction codes corresponding to the instructions converted by said converting means; and
   jump judging means for judging, on the basis of a CPU status signal supplied through a local bus, whether the CPU reads continuous instructions or discontinuous instructions due to an address jump, for transmitting the instruction codes stored in said instruction queue means to the CPU through the local bus when the continuous instructions are read, and for transmitting addresses from the CPU to said memory means through said converting means when the discontinuous instructions are read,
   wherein said cache memory means reads and stores jump destination instructions from said memory means,
   wherein said converting means judges types of instructions during the conversion operation, and
   wherein, when an instruction is judged as being an unconditional branch instruction, without converting the unconditional branch instruction, said converting means determines a jump destination address of a next instruction to be executed after the unconditional branch instruction is executed, retrieves the next instruction to be executed from one of said memory means and said cache memory means, converts the next instruction into a corresponding instruction code, and stores the corresponding instruction code of the converted next instruction in said instruction queue means.

2. The emulation apparatus of claim 1, wherein said converting means first attempts to obtain the received instructions from said cache memory means, and if said received instructions are not currently stored in said cache memory means, said converting means then obtains the received instructions from said memory means.

3. The emulation apparatus of claim 1, wherein said jump judging means executes the judging operation on the basis of whether the CPU status signal includes a signal representative of a queue clear status.

4. The emulation apparatus of claim 1, wherein said jump judging means executes the judging operation on the basis of whether instruction fetch addresses are continuous or discontinuous.

5. The emulation apparatus of claim 1, wherein said cache memory means reads and stores instructions next to instructions read out by the CPU from said memory means, and
   wherein said cache memory means reads and stores jump destination instructions obtained from said memory means.

6. The emulation apparatus of claim 1, wherein said cache memory means stores data in addition to the instruction read from said memory means.

7. The emulation apparatus of claim 3, wherein said cache memory means reads and stores instructions next to instructions read out by the CPU from said memory means.

8. The emulation apparatus of claim 3, wherein said cache memory means stores data in addition to the instruction read from said memory means.

9. The emulation apparatus of claim 3, wherein the queue clear status is indicative of whether any instruction codes are currently stored in said instruction queue means.

10. The emulation apparatus of claim 4, wherein said cache memory means reads and stores instructions next to instructions read out by the CPU from said memory means.

11. The emulation apparatus of claim 4, wherein said cache memory means stores data in addition to the instruction read from said memory means.

12. An emulation apparatus, comprising:
    memory means for storing instructions;
    memory bus means for transmitting addresses to said memory means and reading instructions corresponding to the transmitted addresses from said memory means;
    cache memory means for storing the instructions read from said memory means through said memory bus means;
    converting means for receiving instructions corresponding to an address transmitted from a CPU to be emulated, the received instructions being read from said cache memory means via said memory bus means when the received instructions are obtained from said cache memory means and being read from said memory means via said memory bus means when the received instructions are not obtained from said cache memory means, and for converting the received instructions into instruction codes;

instruction queue means for storing the instruction codes corresponding to the instructions converted by said converting means; and jump judging means for judging, on the basis of a CPU status signal supplied through a local bus, whether the CPU reads continuous instructions or discontinuous instructions due to an address jump, for transmitting the instruction codes stored in said instruction queue means to the CPU through the local bus when the continuous instructions are read, and for transmitting addresses from the CPU to said memory means through said converting means when the discontinuous instructions are read, wherein said jump judging means executes the judging operation on the basis of whether the CPU status signal includes a signal representative of a queue clear status, wherein said cache memory means reads and stores jump destination instructions from said memory means, wherein said converting means judges types of instructions during the conversion operation, and wherein, when an instruction is judged as being an unconditional branch instruction, without converting the unconditional branch instruction, said converting means determines a jump destination address of a next instruction to be executed after the unconditional branch instruction is executed, retrieves the next instruction to be executed from one of said memory means and said cache memory means, converts the next instruction into a corresponding instruction code, and stores the corresponding instruction code of the converted next instruction in said instruction queue means.

13. An emulation apparatus, comprising:

memory means for storing instructions;

memory bus means for transmitting addresses to said memory means and reading instructions corresponding to the transmitted addresses from said memory means;

cache memory means for storing the instructions read from said memory means through said memory bus means;

converting means for receiving instructions corresponding to an address transmitted from a CPU to be emulated, the received instructions being read from said cache memory means via said memory bus means when the received instructions are obtained from said cache memory means and being read from said memory means via said memory bus means when the received instructions are not obtained from said cache memory means, and for converting the received instructions into instruction codes;

instruction queue means for storing the instruction codes corresponding to the instructions converted by said converting means; and jump judging means for judging, on the basis of a CPU status signal supplied through a local bus, whether the CPU reads continuous instructions or discontinuous instructions due to an address jump, for transmitting the instruction codes stored in said instruction queue means to the CPU through the local bus when the continuous instructions are read, and for transmitting addresses from the CPU to said memory means through said converting means when the discontinuous instructions are read, wherein said jump judging means executes the judging operation on the basis of whether instruction fetch addresses are continuous or discontinuous, wherein said cache memory means reads and stores jump destination instructions from said memory means, wherein said converting means judges types of instructions during the conversion operation, and wherein, when an instruction is judged as being an unconditional branch instruction, without converting the unconditional branch instruction, said converting means determines a jump destination address of a next instruction to be executed after the unconditional branch instruction is executed, retrieves the next instruction to be executed from one of said memory means and said cache memory means, converts the next instruction into a corresponding instruction code, and stores the corresponding instruction code of the converted next instruction in said instruction queue means.

14. The emulation apparatus of claim 12, wherein when the instruction is judged to be the unconditional branch instruction, the corresponding instruction code of the unconditional branch instruction is not sent to the CPU so that the CPU does not execute the unconditional branch instruction, and wherein the CPU continuously executes a first instruction immediately preceding the unconditional branch instruction and the next instruction as a result.

15. The emulation apparatus of claim 12, wherein said jump judging means outputs a next address signal corresponding to a destination address of a discontinuous branch instruction to said converting means simultaneously with outputting the initialize signal to said instruction queue means, and wherein said converting means continuously reads instructions obtained from said cache memory means and said memory means in a sequential memory address location order after receipt of the next address signal sent by said jump judging means.

16. A method of emulating a CPU, comprising the steps of:

a) storing instructions in a main memory;

b) storing a subset of the instructions in a cache memory;

c) receiving, by a converter, an instruction sent from the CPU which includes an address transmitted from the CPU;

d) converting, by said converter, the instruction sent from the CPU into an instruction code;

e) storing the instruction code in an instruction queue;

f) receiving a CPU status signal sent from the CPU, the CPU status signal indicative of whether the CPU is currently reading a continuous instruction or a discontinuous instruction, the discontinuous instruction corresponding to an unconditional branch instruction;

g) transmitting the instruction code stored in said instruction queue to the CPU through a local bus when the CPU status signal indicates that the CPU is reading the continuous instruction; and h) sending the address transmitted from the CPU to said main memory through said converter when the CPU status signal indicates that the CPU is reading the discontinuous instruction, wherein said cache memory reads and stores jump destination instructions from said main memory, wherein said converting step d) judges types of instructions, and wherein, when an instruction is judged as being an unconditional branch instruction, without converting the unconditional branch instruction, said converting step d) determines a jump destination address of a next instruction to be executed after the unconditional branch instruction is executed, retrieves the next instruction to be executed from one of said main memory and said cache memory, converts the next instruction into a corresponding instruction code, and stores the corresponding instruction code of the converted next instruction in said instruction queue.

17. An emulation apparatus, comprising:

memory means for storing instructions;

memory bus means for transmitting addresses to said memory means and reading instructions corresponding to the transmitted addresses from said memory means;

cache memory means for storing the instructions read from said memory means through said memory bus means;

converting means for receiving instructions corresponding to an address transmitted from a CPU to be emulated, the received instructions being read from said cache memory means via said memory bus means when the received instructions are obtained from said cache memory means and being read from said memory means via said memory bus means when the received instructions are not obtained from said cache memory means, and for converting the received instructions into instruction codes;

instruction queue means for storing the instruction codes corresponding to the instructions converted by said converting means in a sequential order; and jump judging means for judging, on the basis of a CPU status signal supplied through a local bus, whether the CPU reads continuous instructions or discontinuous instructions due to an address jump, for transmitting the instruction codes stored in said instruction queue means and read therefrom on a sequential basis to the CPU through the local bus when the continuous instructions are read, and for transmitting addresses from the CPU to said memory means through said converting means when the discontinuous instructions are read, wherein said jump judging means outputs an initialize signal to said instruction queue means to cause instructions to be written out of said instruction queue means in a sequential manner starting at a predetermined storage location when the CPU status signal is indicative of the CPU reading one of the discontinuous instructions, wherein said cache memory means reads and stores jump destination instructions from said memory means, wherein said converting means judges types of instructions during the conversion operation, and wherein, when an instruction is judged as being an unconditional branch instruction, without converting the unconditional branch instruction, said converting means determines a jump destination address of a next instruction to be executed after the unconditional branch instruction is executed, retrieves the next instruction to be executed from one of said memory means and said cache memory means, converts the next instruction into a corresponding instruction code, and stores the corresponding instruction code of the converted next instruction in said instruction queue means.

18. The emulation apparatus of claim 17, wherein the predetermined storage location is a first storage location of said instruction queue means, wherein said instruction queue means operates on a first-in, first-out basis, wherein when said jump judging means judges that the CPU has read the one of the discontinuous instructions due to an address jump, said jump judging means outputs a destination address of the one of the discontinuous instructions to said converting means, and wherein said converting means retrieves an instruction at the destination address from one of said cache memory means and said memory means so as to convert the instruction into an instruction code and to input the instruction code corresponding to the instruction into the first storage location of said instruction queue means.

* * * * *